Patented Oct. 26, 1926.

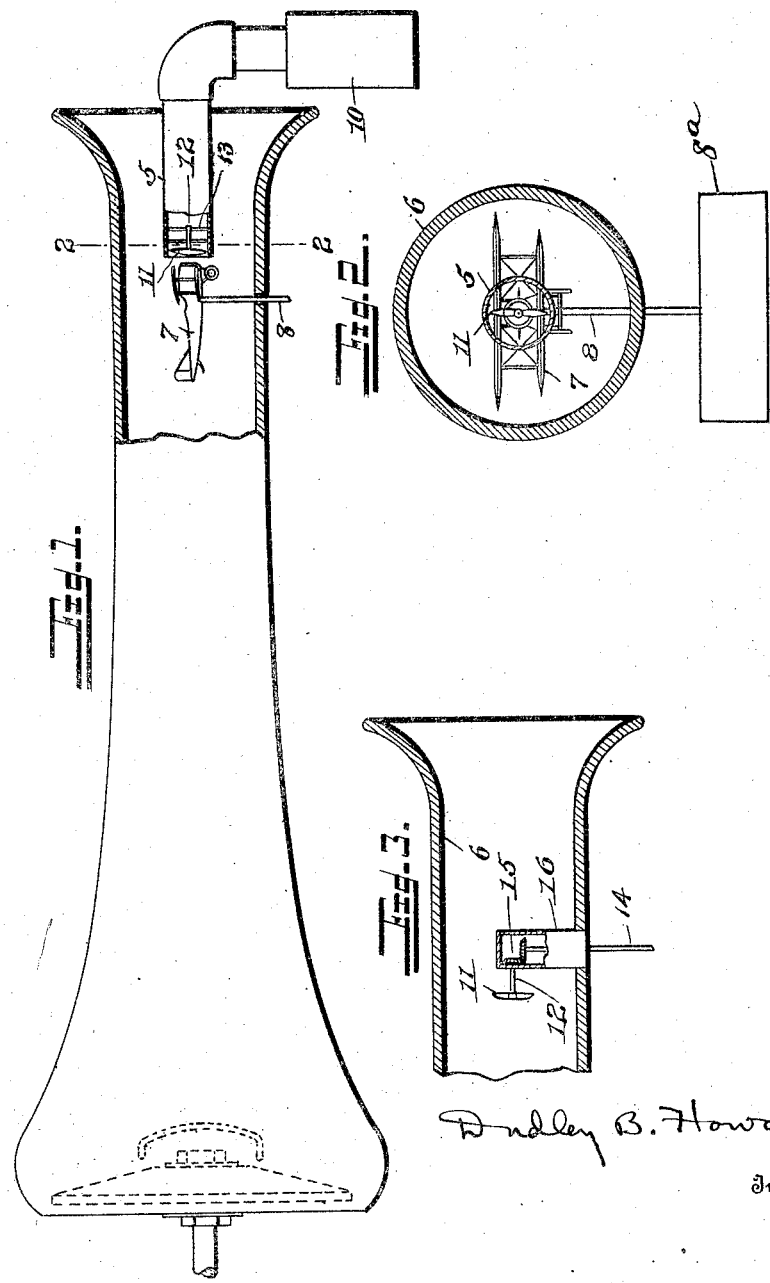

1,604,828

UNITED STATES PATENT OFFICE.

DUDLEY B. HOWARD, OF DAYTON, OHIO.

METHOD OF AND MEANS FOR PRODUCING AN ARTIFICIAL SLIPSTREAM IN TESTING AIRPLANE MODELS.

Application filed February 25, 1921. Serial No. 447,642.

This invention relates to the wind tunnel testing of airplane models and in particular to a method of testing which contemplates the projection of an artificial slipstream against certain surfaces of the model in addition to the main current of air passing through the wind tunnel.

Heretofore it has not been the practice to simulate the effect of the propeller blast, or slipstream, in the testing of airplane models. The model has been subjected only to the main stream of air representing the relative motion of an airplane and the air through which it moves in actual flight. Therefore, a true test is not given the model.

It it the primary object of the present invention to provide a method of, and means for, simulating the effect of the slipstream by projecting a current of air against the fuselage surfaces and other surfaces corresponding to those of a full size ship which are influenced by the slipstream. This additional air current will have a velocity sufficiently higher than that of the main stream in the tunnel to produce the desired effect.

A further object is to simulate the swirling motion of the real slipstream by using a miniature propeller either as means for generating the artificial slipstream or as a driven element mounted in the slipstream produced by other means.

It is proposed further to provide means for carrying into effect the improved method of testing which may be installed in a wind tunnel of the construction now in use without making any material alterations therein.

Other objects and advantages of the invention may become apparent as the following specific description is read in connection with the accompanying drawings, in which:

Fig. 1 is a longitudinal section through a wind tunnel of the usual type, showing means for producing an artificial slipstream applied thereto;

Fig. 2 is a transverse section on line 2—2 of Fig. 1;

Fig. 3 is a longitudinal section through a portion of the wind tunnel, showing a miniature propeller having means for positively driving the same to produce the slipstream.

In the accompanying drawings, one convenient and simple form of apparatus is disclosed for the purpose of illustration. It is to be understood, however, that the new method may be followed by the use of various other mechanical devices. Alternative arrangements of parts or complete substitution of apparatus may be made in practice within the spirit of the invention.

In the apparatus which has been selected in illustrating the principles involved, a nozzle 5 may extend axially into the inlet end of the wind tunnel 6. The wind tunnel represented is a conventional type and only those features which are essential to the present disclosure are shown in detail The numeral 7 designates an airplane model mounted within the tunnel for test upon the spindle 8 of the balance 8$^a$ represented diagrammatically in Fig. 2. The mouth of the nozzle 5 should be positioned very close to the nose of the model fuselage with its axis substantially coincident to the imaginary propeller axis of the model. An air pump 10 of any suitable type may be connected with the nozzle for the purpose of projecting a stream of air against the model at a velocity bearing the same ratio to the velocity of the main stream of air that the actual slipstream in practice bears to the air speed of a full size ship. The velocity of the artificial slipstream may be varied during the test by regulating the speed of the air pump, or in any other convenient manner. The internal diameter of the nozzle should approximate that of a miniature propeller appropriate for use on the model.

The swirling movement of a slipstream may be simulated by the use of a miniature propeller, such as that indicated at 11 in the drawings. This propeller may be mounted in any desirable location, but, by way of example, is shown attached to shaft 12 journalled in the bearings 13 in the mouth of the nozzle. The distance from the miniature propeller to the nose of the model fuselage should correspond to the distance of separation in a full size airplane. While the propeller may be driven by any desired means, it may be rotated at the appropriate speed by the blast of air passing through the nozzle.

As shown in Fig. 3, the artificial slipstream may be generated by the miniature propeller itself. The propeller shaft may be connected with some suitable source of power (not shown) by means of shaft 14 and gears 15 encased in streamline strut 16.

It is to be understood that the method and apparatus described herein are not restricted to the testing of complete airplane models.

The testing of other aerofoils, such as models of airships, individual parts of airships, such as gas bags, nacelles, etc., and individual parts of an airplane model such as the fuselage, wings, struts, etc., is also contemplated. In the testing of any aerofoil or a model of an aircraft which is propelled by an engine in practice, relative motion is produced, within the spirit of the present invention, between the aerofoil and a volume of fluid to simulate the actual slipstream of practice, or relative motion is produced between a plurality of fluid streams and appropriate parts of the aerofoil to simulate both the main air stream and the artificial slipstream of actual flight. This should be obvious from the disclosure in the preceding paragraphs, and it is pointed out more definitely to avoid misinterpretation of the appended claims.

It has been stated in this specification that the invention is intended primarily for the testing of airplane models. That means the testing of a complete model wherein all the component aerofoils are assembled into an integral structure similar in outward form and proportions to the full-size airplane which it represents. It is obvious that a complete model of an airship of the lighter-than-air type, which has in practice one or more engines and propellers for propelling the craft through the air, or any other kind of self-propelled aircraft in the operation of which a slipstream is created, may be tested according to the principle of the present invention.

The invention has likewise been described as applicable to testing inside a wind tunnel. It should be pointed out in this connection that the testing of an aerofoil in the open air, by the production of relative motion between the air and the model in some way, either by moving the model through the air or moving the air past a stationary model, may include the creation of an artificial slipstream in accordance with the invention. This method of testing an aircraft model, or any aerofoil, is not to be considered as restricted to the conventional wind tunnel practice.

I claim:

1. The method testing an aircraft model which consists in producing relative motion between the model and a volume of fluid to simulate air speed in flight, directing a stream of fluid against appropriate surfaces of the model to simulate the slipstream of actual flight, and measuring the forces and moments applied to the model by the relative motion between the latter and the fluid.

2. The method of testing an aerofoil which consists in producing relative motion between the aerofoil and a volume of fluid to simulate air speed in flight, directing a stream of fluid against certain surfaces of the aerofoil, and measuring the forces and moments applied to the aerofoil by the relative motion between the latter and the fluid.

3. The method of testing an aerofoil which consists in directing a plurality of fluid streams of different velocities against the aerofoil, and in measuring the forces and moments applied to the aerofoil by the fluid streams.

4. In an apparatus for testing aircraft models, means attaching said models to means for measuring the forces and moments applied to the model to be tested, means for producing relative motion between the model and a volume of fluid to simulate air speed in flight, and means for directing a stream of fluid against appropriate surfaces of the model to simulate the slipstream of flight.

5. In an apparatus for testing aerofoils, means attaching said aerofoils to means for measuring the forces and moments applied to the aerofoil to be tested, means for producing relative motion between the aerofoil and a volume of fluid to simulate air speed in flight, and means for directing a stream of fluid against certain surfaces of the aerofoil.

6. In a wind tunnel for testing aerofoil models, means for producing a main stream through the tunnel, means for creating an artificial slipstream moving at a velocity greater than that of the main stream, and means attaching said models to means for measuring the forces and moments applied to the model to be tested in the tunnel.

7. In an apparatus for testing aircraft models, means attaching said models to means for measuring the forces and moments applied to the model to be tested, means for producing relative motion between the model and a volume of fluid to simulate air speed in flight, a miniature propeller mounted in a position to direct a fluid stream against appropriate surfaces of the model to simulate the slipstream of flight, and means for operating the propeller.

8. In an apparatus for testing aircraft models, means for producing relative motion between the model to be tested and a volume of fluid to simulate air speed in flight, a miniature propeller mounted to direct a fluid stream against appropriate surfaces of the model to simulate the slipstream of flight, a source of power disposed outside the model, and means for connecting the source of power with the propeller to operate the latter.

9. In a wind tunnel, means for producing a main stream through the tunnel, and a nozzle adapted to project an artificial slipstream through the main stream at a velocity greater than that of the latter.

10. In a wind tunnel, means for producing a main stream through the tunnel, a nozzle adapted to project an artificial slipstream through the main stream at a velocity greater than that of the latter, and means for imparting swirling motion to the slipstream.

11. In a wind tunnel, means for producing a main stream through the tunnel, a nozzle adapted to project an artificial slipstream through the main stream at a velocity greater than that of the latter, and a miniature propeller positioned in such relation to the nozzle as to impart swirling motion to the slipstream.

In testimony whereof I have affixed my signature.

DUDLEY B. HOWARD.